(12) United States Patent
Feng

(10) Patent No.: US 10,668,841 B2
(45) Date of Patent: Jun. 2, 2020

(54) REMOVABLE SEAT BACKREST COVER

(71) Applicant: Tim Feng, Brampton (CA)

(72) Inventor: Tim Feng, Brampton (CA)

(*) Notice: Subject to any disclaimer, the term of this patent is extended or adjusted under 35 U.S.C. 154(b) by 0 days.

(21) Appl. No.: 16/036,533

(22) Filed: Jul. 16, 2018

(65) Prior Publication Data

US 2020/0017007 A1   Jan. 16, 2020

(51) Int. Cl.
*B60N 2/60* (2006.01)

(52) U.S. Cl.
CPC .................. *B60N 2/6036* (2013.01)

(58) Field of Classification Search
CPC ................................... B60N 2/6036
USPC ................................... 297/228.13
See application file for complete search history.

(56) References Cited

U.S. PATENT DOCUMENTS

| | | | | |
|---|---|---|---|---|
| 6,079,779 A | * | 6/2000 | Tanaka | B60N 2/585 297/228.13 X |
| 7,673,939 B2 | * | 3/2010 | Taguchi | B60N 2/5816 297/228.13 X |
| 8,500,198 B2 | * | 8/2013 | Sugiura | B60N 2/6018 297/228.13 X |
| 8,820,833 B2 | * | 9/2014 | Tsuchiya | B60N 2/682 297/218.3 |
| 2007/0040426 A1 | * | 2/2007 | Kenny | B60N 2/6018 297/228.13 X |

* cited by examiner

*Primary Examiner* — Anthony D Barfield

(57) ABSTRACT

A protective seat backrest cover which can be quickly and easily installed and/or removed consisting of a cover with a seam down one side, allowing it to be opened and wrapped around a seat backrest and then closed and fastened, without removing the headrest.

2 Claims, 5 Drawing Sheets

REMOVABLE SEAT BACKREST COVER

CROSS REFERENCE TO RELATED APPLICATION

Not Applicable

TECHNICAL FIELD

The present invention relates to removable protective covers for car seats.

BACKGROUND OF THE INVENTION

Automobile seats see much wear from normal use during their lifetimes. To mitigate this one may install protective seat covers. Seat covers may also serve other purposes, such as comfort and aesthetic. For ease of installation, the upright seat backrest and lower seat portion of car seats are usually covered by separate articles.

Traditional seat backrest covers are generally shaped to provide a close form fit over a car seat backrest, being dimensioned roughly as oblong rectangular prisms or ovoids, being open at one end and having smaller openings on the other for the headrest. They are installed by removing the headrest from the seat, positioning the open end over the top of the seat, and sliding it down to the base, thereafter replacing the headrest. This presents a number of problems. Headrest assemblies have changed over the years and removing the headrest from the car seats of some older vehicles can be problematic, requiring additional tools and time. Additionally, due to the form fitting shape and common seal cover materials, such as polyurethane foam, installation can be a time-consuming process requiring at times excessive force to overcome snags or friction between the cover and the seat. This can also lead to accidental tearing of the seat cover during installation.

What is desired is a seat backrest cover which can be installed and removed easily and quickly without requiring removal of the headrest.

SUMMARY OF THE INVENTION

The present invention is a vehicle seat backrest cover being, when closed, shaped to the form factor of a car seat backrest and having a large opening at the bottom or base of the cover, a smaller opening at the top to accommodate a headrest, and a seam running the whole length from the upper opening to the bottom opening along the top side portion and one side of said cover, said seam being closable by attachment means such that when said cover is positioned and said seam is closed the cover securely encloses the seat backrest. When said seam is open one can essentially wrap or unwrap the cover easily from the car seat backrest.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying Figures, in which.

DETAILED DESCRIPTION OF A PREFERRED EMBODIMENT

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

Figure 1:
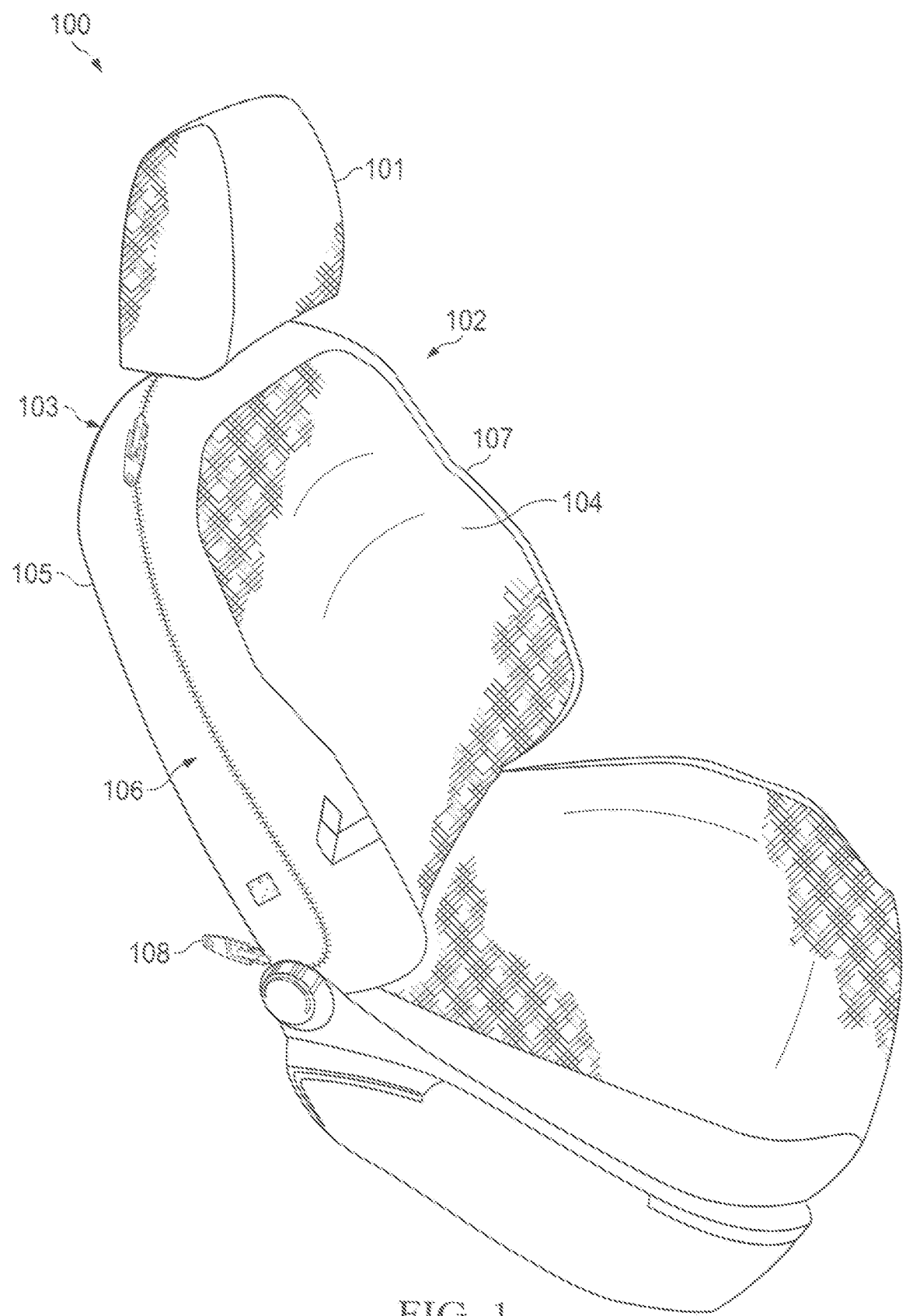
FIG. 1 shows a car seat with car seat backrest cover installed and seam closed, in one embodiment of the present invention.
Figure 2:
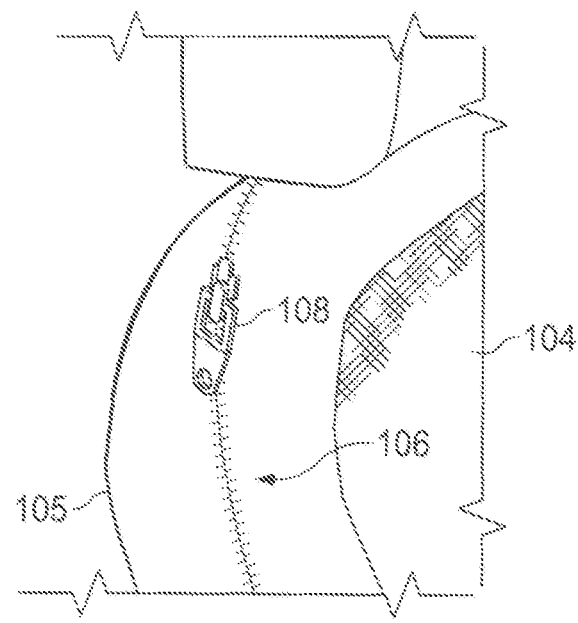
FIG. 2 is a close-up of the upper portion of an attachment means in one embodiment of the present invention.
Figure 3:
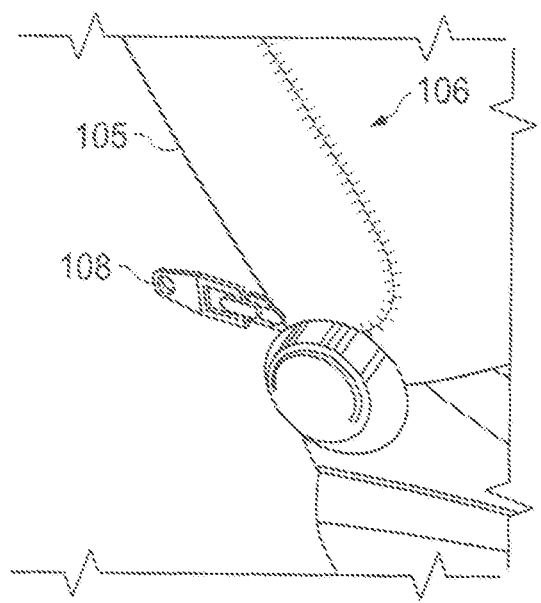
FIG. 3 is a close-up of the lower portion of an attachment means in one embodiment of the present invention.
Figure 4:
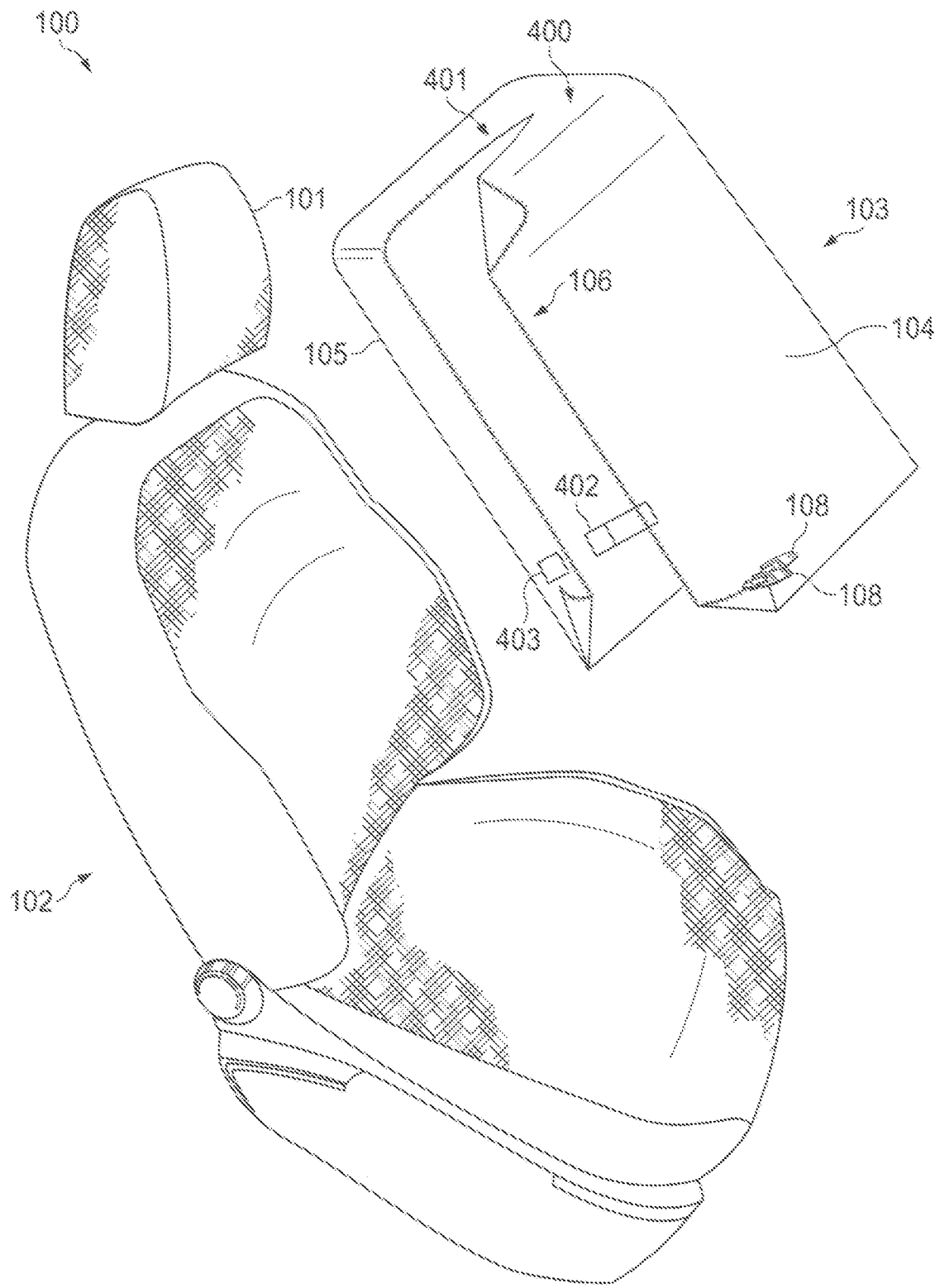
FIG. 4 shows a car seat and uninstalled car seat backrest cover with seam open in one embodiment of the present invention.
Figure 5A:
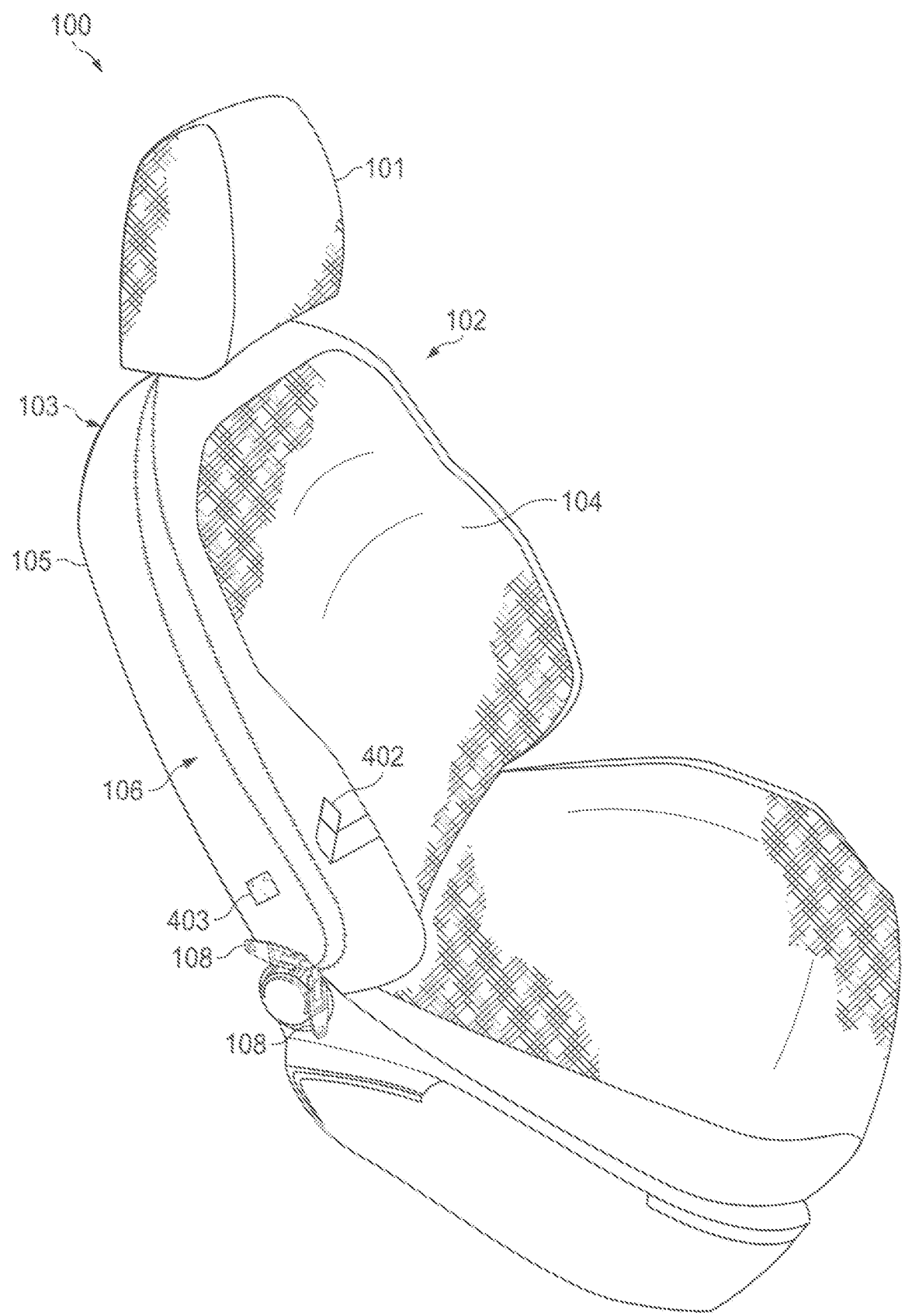
FIGS. 5A and 5B shows a car seat with the installed seal backrest cover in an open and closed configuration, respectively, in an embodiment of the present invention.
Figure 5B:
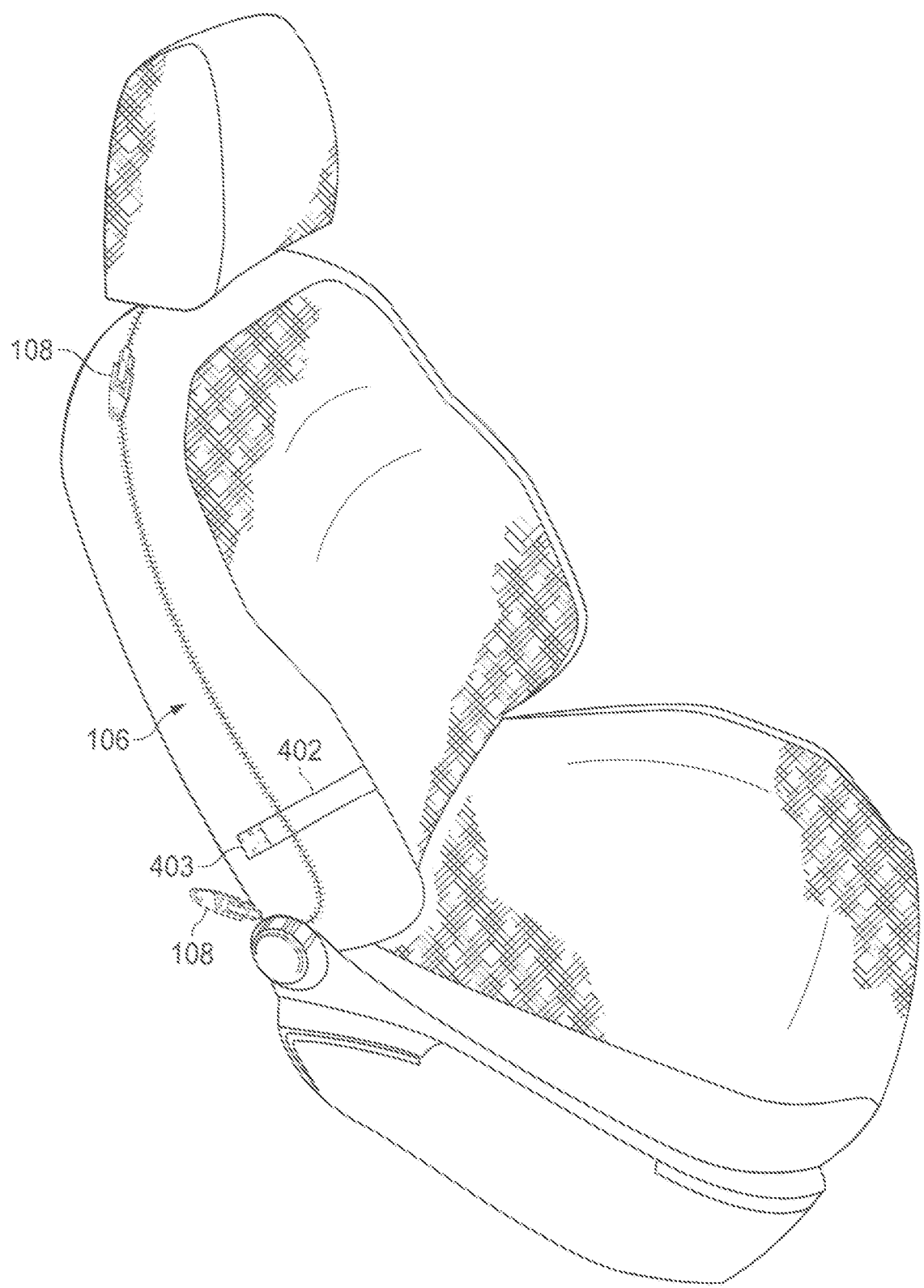

As used herein, the term "car seat backrest" refers to the upright backrest portion of a car seat, as opposed to the fewer seating portion. Referring to FIGS. 1 and 4, the present invention is a removable seat backrest cover 103 which, when closed using a coupling means along the side of the car seat backrest as shown in FIG. 5b, is dimensioned so as to wrap securely and completely around the upright car seat backrest 102 of a conventional car seat 100. The cover comprises a single article of flexible material, such as a knitted, woven, or plastic material, having in its closed configuration approximately the shape of a flattened ovoid or rectangular prism, said prism shaped flexible material being hollow and open on the bottom and having a front portion 104, back portion, first side portion 105, second side portion 107, a top portion 400, and an inner and outer surface, the top portion having in its geometric center a small opening 401 with its longer sides adjacent the front and back portions, said cover further comprising a seam or slit 106 latitudinally running from the top portion opening side adjacent the first side portion through the top portion 400 and down, longitudinally, the first side portion 105, terminating at the bottom opening, illustrated in FIG. 4, such that said cover may be opened, as shown in FIG. 5a, and removed, as shown in FIG. 4, said top portion opening 401 having around its perimeter an elastic material and being dimensioned such that it accommodates the supports between a headrest and the upper portion of a car seat backrest 102 when slid laterally onto a car seat backrest, allowing said cover to be installed by sliding onto or wrapping around said car seat backrest 102 without removing said headrest 101. In an embodiment, the opening 401 has a rectangular shape. Said car seat backrest cover of the present invention is being dimensioned to resemble the form factor of a car seat backrest in its closed configuration, said car seat backrest cover in the shape of a rectangular prism narrows laterally towards its top surface beginning at a plane parallel with said top surface and located approximately halfway up said prism, said upper surface edges being rounded off, and the front portion of said prism being recessed ergonomically, as shown in FIG. 1.

Said car seat backrest cover of the present invention further comprises an attachment means 108 along or near the first side portion seam 106 located along a longitudinal side such that the two sides of said seam may be securely and reversibly attached when said cover is in a closed configuration, as shown in FIG. 5a. Said attachment means may include button fasteners, hook-and-loop type fasteners, zipper fasteners or other easily operated temporary attachment means. In one embodiment of the present invention, said attachment means 108 comprises a clasp locker or zipper with interlocking teeth running the full lengths of each side of said seam 106 and one or two zipper heads or sliders, such that said seam may be opened and closed by operating said zipper, comprising the steps of manually moving a zipper head along the length of said seam thereby forcing said lengths of teeth into an interlocking or unlocked configuration.

Said car seat backrest cover of the present invention further comprises, in another embodiment, an additional clasp or attachment means located on the inner surface of the first side portion, said additional attachment means comprising, for example, a hook-and-loop type fastener having one attachment surface 402 with a plurality of plastic hooks located on a strap on the inner surface of the first side portion and extendable across said seam to a second attachment surface 403 with a plurality of plastic loops located on the inner surface of said first side portion opposite said seam such that when said surfaces are pressed together, shown in FIG. 5b, they are reversibly attached, said additional attachment means being operable to temporarily hold said seam sides in close proximity while operating said first attachment means, for example, while closing said zipper.

The inner and outer surfaces of said car seat backrest cover front portion may further comprise foam backing or other padding for additional comfort. In another embodiment, said car seat backrest cover of the present invention may be made in whole or in part of an elastic material allowing for a tighter fit and in order to accommodate a wider range of air seat sizes and configurations, for example low-backrest and high-backrest seats.

Said car seat backrest cover of the present invention is installed by operating said attachment means so that the cover is in an open configuration, for example by moving both zipper heads to one end of said seam and removing one side of said seam from said zipper heads, positioning said seat backrest cover such that the front portion is facing forward, the first side portion with seam and attachment means is largely vertical and facing the side of the upright portion of the car seat, and the smaller opening is facing upward, as shown in FIG. 4, wrapping the cover around said car seat backrest such that the bottom opening is substantially flush with the base of the car set backrest, the upper opening is wrapped around the headrest supports, and the car seat backrest is substantially enclosed by said car seat backrest cover, shown in FIG. 5a, operating a secondary attachment means to hold said seam sides in close proximity, seen as 402 and 403 of FIG. 5b, and finally operating a first attachment means 108 in FIG. 5b to securely and reversibly close seam 106. Said car seat backrest cover of the present invention is removed by the reverse process, first operating attachment means 108 to open said seam 106, unfastening secondary attachment means 402 and 403, and sliding said cover off of said car seat backrest.

An additional embodiment of the present invention is dimensioned to fit a car seat headrest, being largely a hollow rectangular prism open at the bottom and having a seam with an attachment means running from a point on the top surface along a side portion to the bottom opening.

The embodiments shown and described above are only exemplary. For example, the term "car seat backrest" is used throughout, but the term "car" also means, truck, ATV, UTV, tractor, riding equipment, airplane, or any other vehicle or conveyance in which there is a seat backrest. Even though numerous characteristics and advantages of the present invention have been set forth in the foregoing description, the disclosure is illustrative only and changes may be made within the principles of the invention to the full extent indicated by the broad general meaning of the terms used herein. Various alterations, modifications and substitutions can be made to the disclosed invention without departing in any way from the spirit and scope of the invention.

I claim:

1. A seat backrest cover, comprising:
   a flexible material dimensioned approximately as a rounded hollow rectangular prism to fit the form factor of a car seat backrest, said flexible material having a front portion, back portion, first and second side portions, an upper portion, an inner and outer surface, and no bottom portion;
   the flexible material operable to substantially enclose a car seat backrest when installed, said flexible material having a seam running from a point on its upper portion down the length of said first side portion and terminating at the bottom opening of said flexible material, allowing said flexible material to be wrapped around, or opened and removed from, said car seat backrest;
   said flexible material has coupled thereto a primary attachment means along or proximate said seam such that the sides of said seam may be securely and reversibly fastened, thereby mating two adjacent portions of said flexible material;
   said flexible material has further coupled thereto a secondary attachment means located on the inner surface of said first side portion such that the sides of said seam can be temporarily held in close proximity while operating said primary attachment means, said secondary attachment means being a hook-and-loop type fastening system comprising a first attachment surface having a plurality of plastic hooks and being located on a strap extending from one side of said seam on the inner surface of said first side portion, and a second attachment surface having a plurality of plastic loops and being located on the opposite side of said seam on the inner surface of said first side portion, such that said attachment surfaces are reversibly fastened when pressed together.

2. An apparatus, comprising:
   a seat backrest cover dimensioned approximately as a rounded hollow rectangular prism to fit the form factor of a car seat backrest, said hollow prism having a front portion, back portion, first and second side portions, an upper portion, an inner and outer surface, and no bottom portion;
   said seat backrest cover having on said upper portion a rectangular opening, said opening being dimensioned to accommodate the supports between a headrest and car seat backrest;
   said seat backrest cover further having a seam running from said upper portion opening down the length of said first side portion and terminating at the bottom opening of said prism such that said upper portion opening and said bottom opening are connected by said seam;

said seat backrest cover further having a primary attachment mechanism, said primary attachment mechanism being a zipper fastening system comprising a length of interlocking teeth on either side of said seam and one or more zipper heads, said zipper fastening system being operable to securely and reversibly close said seam;

said seat backrest cover further having a secondary attachment mechanism, said secondary attachment mechanism being a hook-and-loop type fastening system comprising a first attachment surface having a plurality of plastic hooks and being located on a strap extending from one side of said seam on the inner surface of said first side portion, and a second attachment surface having a plurality of plastic loops and being located on the opposite side of said seam on the inner surface of said first side portion, such that said attachment surfaces are reversibly fastened when pressed together.

* * * * *